(12) United States Patent
Chuang

(10) Patent No.: US 9,960,576 B2
(45) Date of Patent: May 1, 2018

(54) COVER ASSEMBLIES FOR CABLES AND ELECTRICAL CONNECTIONS AND METHODS FOR MAKING AND USING THE SAME

(71) Applicant: Tyco Electronics Corporation, Berwyn, PA (US)

(72) Inventor: Kok Chywn Chuang, Raleigh, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 64 days.

(21) Appl. No.: 15/136,445

(22) Filed: Apr. 22, 2016

(65) Prior Publication Data

US 2017/0310093 A1    Oct. 26, 2017

(51) Int. Cl.
H02G 1/14    (2006.01)

(52) U.S. Cl.
CPC ..................... *H02G 1/14* (2013.01)

(58) Field of Classification Search
None
See application file for complete search history.

(56) References Cited

U.S. PATENT DOCUMENTS

| | | | |
|---|---|---|---|
| 3,163,707 A | 12/1964 | Darling | |
| 3,475,719 A | 10/1969 | Akin et al. | |
| 4,601,529 A | 7/1986 | Billet | |
| 5,233,363 A | 8/1993 | Yarsunas et al. | |
| 5,286,220 A | 2/1994 | Watson | |
| 5,315,063 A | 5/1994 | Auclair | |
| 5,577,926 A | 11/1996 | Cox | |
| 5,740,583 A * | 4/1998 | Shimada | A47L 9/244 15/377 |
| 6,364,677 B1 | 4/2002 | Nysveen et al. | |
| 7,182,617 B1 | 2/2007 | Cairns et al. | |
| 7,264,494 B2 | 9/2007 | Kennedy et al. | |
| 7,476,114 B1 | 1/2009 | Contreras | |
| 7,728,227 B2 * | 6/2010 | Portas | H02G 15/1826 138/103 |
| 7,858,883 B2 | 12/2010 | Seraj et al. | |
| 8,030,570 B2 | 10/2011 | Seraj et al. | |

(Continued)

OTHER PUBLICATIONS

U.S. Appl. No. 15/142,759, filed Apr. 29, 2016, O'Sullivan.

(Continued)

*Primary Examiner* — Dimary Lopez Cruz
(74) *Attorney, Agent, or Firm* — Myers Bigel, P.A.

(57) ABSTRACT

An integral, unitary cover assembly for covering an electrical connection between first and second electrical cables each having a primary conductor and a neutral conductor includes an inner elastomeric sleeve, an outer elastomeric sleeve, and a collapsible duct. The inner elastomeric sleeve defines a cable passage to receive the electrical connection and the primary conductors of the first and second cables. The outer elastomeric sleeve surrounds the inner sleeve. The collapsible duct is interposed radially between the inner and outer sleeves. The duct defines a neutral conductor passage configured to receive at least one of the neutral conductors therethrough. The duct is selectively collapsible from an initial open configuration to a collapsed configuration about the at least one neutral conductor.

19 Claims, 12 Drawing Sheets

(56) References Cited

U.S. PATENT DOCUMENTS

| | | | |
|---|---|---|---|
| 8,205,911 B2* | 6/2012 | Cordes | A47L 9/246 |
| | | | 285/302 |
| 9,224,522 B2 | 12/2015 | Yaworski et al. | |
| 2007/0293087 A1 | 12/2007 | Kennedy et al. | |
| 2008/0143097 A1 | 6/2008 | Canale | |
| 2009/0181583 A1* | 7/2009 | Krabs | H01R 4/726 |
| | | | 439/738 |
| 2010/0279542 A1* | 11/2010 | Seraj | H01R 4/72 |
| | | | 439/502 |

OTHER PUBLICATIONS

"CSJA In-line Cold Shrinkable Joints for 1/C Shielded Power Cables (15-35kV)" Tyco Electronics, 2006/2007, 2 pages.

"CSJA Cold Shrinkable 'All-In-One' Straight Joint for Polymeric Insulated Cables Up to 42 kV" Tyco Electronics EPP 1348, Jul. 2007, 4 pages.

\* cited by examiner

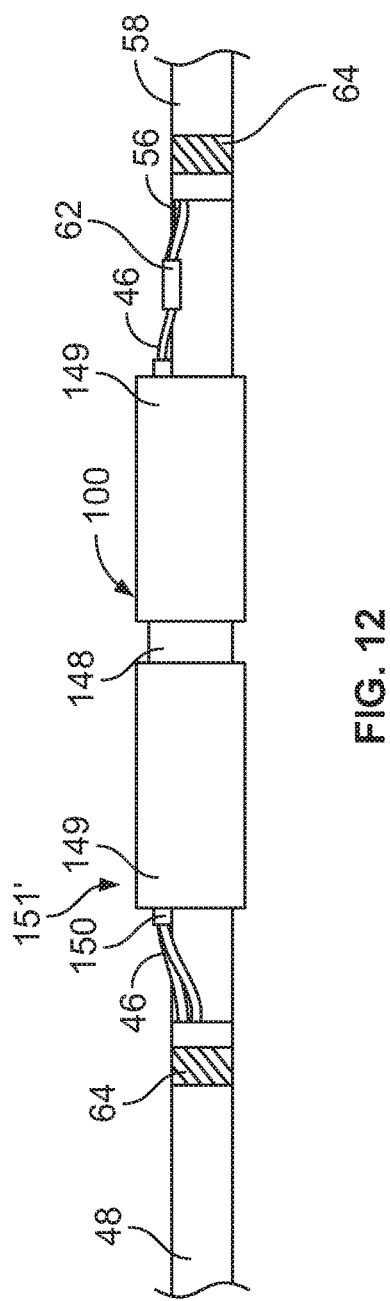
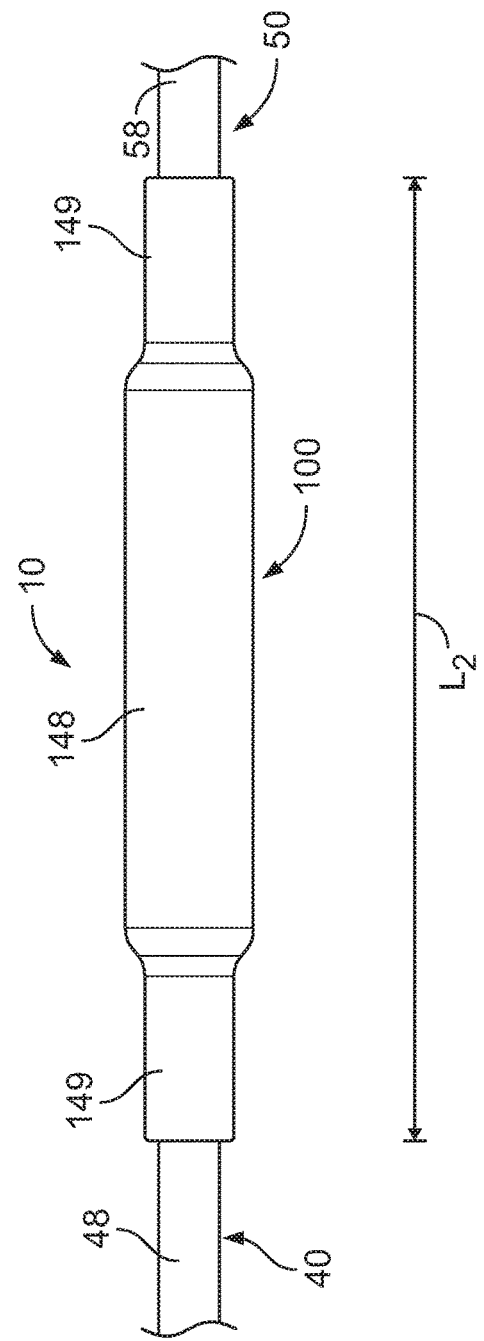

COVER ASSEMBLIES FOR CABLES AND ELECTRICAL CONNECTIONS AND METHODS FOR MAKING AND USING THE SAME

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from Tyco Electronics Corporation of Fuquay-Varina, N.C., which includes an integral neutral conductor mesh. It is also known to cover splices between concentric neutral cables using a cold shrink elastomeric cover tube (such as the CSJ product, available from Tyco Electronics Corporation) in combination with a separate re-jacketing cover (such as the GELWRAP™ product, available from Tyco Electronics Corporation). In this case, the cold shrink tube is installed over the primary conductors and the insulation layers, the neutral conductors are laid over the cold shrink tube, and the re-jacketing cover is subsequently wrapped around the neutral conductors and the insulation layer.

SUMMARY OF THE INVENTION

According to embodiments of the invention, an integral, unitary cover assembly for covering an electrical connection between first and second electrical cables each having a primary conductor and a neutral conductor includes an inner elastomeric sleeve, an outer elastomeric sleeve, and a collapsible duct. The inner elastomeric sleeve defines a cable passage to receive the electrical connection and the primary conductors of the first and second cables. The outer elastomeric sleeve surrounds the inner sleeve. The collapsible duct is interposed radially between the inner and outer sleeves. The duct defines a neutral conductor passage configured to receive at least one of the neutral conductors therethrough. The duct is selectively collapsible from an initial open configuration to a collapsed configuration about the at least one neutral conductor.

According to method embodiments of the invention, a method for forming a connection assembly includes forming an electrical connection between first and second electrical cables, the first and second cables each including a primary conductor and at least one neutral conductor. The method further includes providing an integral, unitary cover assembly including: an inner elastomeric sleeve defining a cable passage; an outer elastomeric sleeve surrounding the inner sleeve; and a collapsible duct interposed radially between the inner and outer sleeves, the duct defining a neutral conductor passage configured to receive at least one of the neutral conductors therethrough. The duct is selectively collapsible from an initial open configuration to a collapsed configuration about the at least one neutral conductor. The method further includes: mounting the cover assembly on the cables such that the electrical connection and the primary conductors of the first and second cables extend through the cable passage; with the duct in the open configuration, inserting the at least one neutral conductor of the first cable through the neutral conductor passage of the duct; with the at least one neutral conductor disposed in the neutral conductor passage, collapsing the duct from the open position to the collapsed position; and coupling the at least one neutral conductor of the first cable with the at least one neutral conductor of the second cable.

According to method embodiments of the invention, a method for forming an integral, unitary cover assembly for covering an electrical connection between first and second electrical cables each having a primary conductor and a neutral conductor includes: forming an inner elastomeric sleeve defining a cable passage to receive the electrical connection and the primary conductors of the first and second cables; forming an outer elastomeric sleeve surrounding the inner sleeve; and interposing a collapsible duct radially between the inner and outer sleeves, the duct defining a neutral conductor passage configured to receive at least one of the neutral conductors therethrough. The duct is selectively collapsible from an initial open configuration to a collapsed configuration about the at least one neutral conductor.

According to embodiments of the invention, a connection assembly includes first and second electrical cables each including a primary conductor and at least one neutral conductor, a connector coupling the primary conductors of the first and second cables to form an electrical connection, and an integral, unitary cover assembly. The cover assembly includes an inner elastomeric sleeve, an outer elastomeric sleeve, and a collapsible duct. The inner elastomeric sleeve defines a cable passage. The outer elastomeric sleeve surrounds the inner sleeve. The collapsible duct is interposed radially between the inner and outer sleeves. The duct defines a neutral conductor passage configured to receive at least one of the neutral conductors therethrough. The duct is selectively collapsible from an initial open configuration to a collapsed configuration about the at least one neutral conductor. The electrical connection and the primary conductors of the first and second cables extend through the cable passage and the at least one neutral conductor of the first cable extends through the neutral conductor passage of the duct member and is coupled to the at least one neutral conductor of the second cable.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 10-13 are side views illustrating procedures for installing the cover assembly of FIG. 1 on a pair of concentric neutral cables coupled by a connector.

DETAILED DESCRIPTION OF EMBODIMENTS OF THE INVENTION

Figure 1:
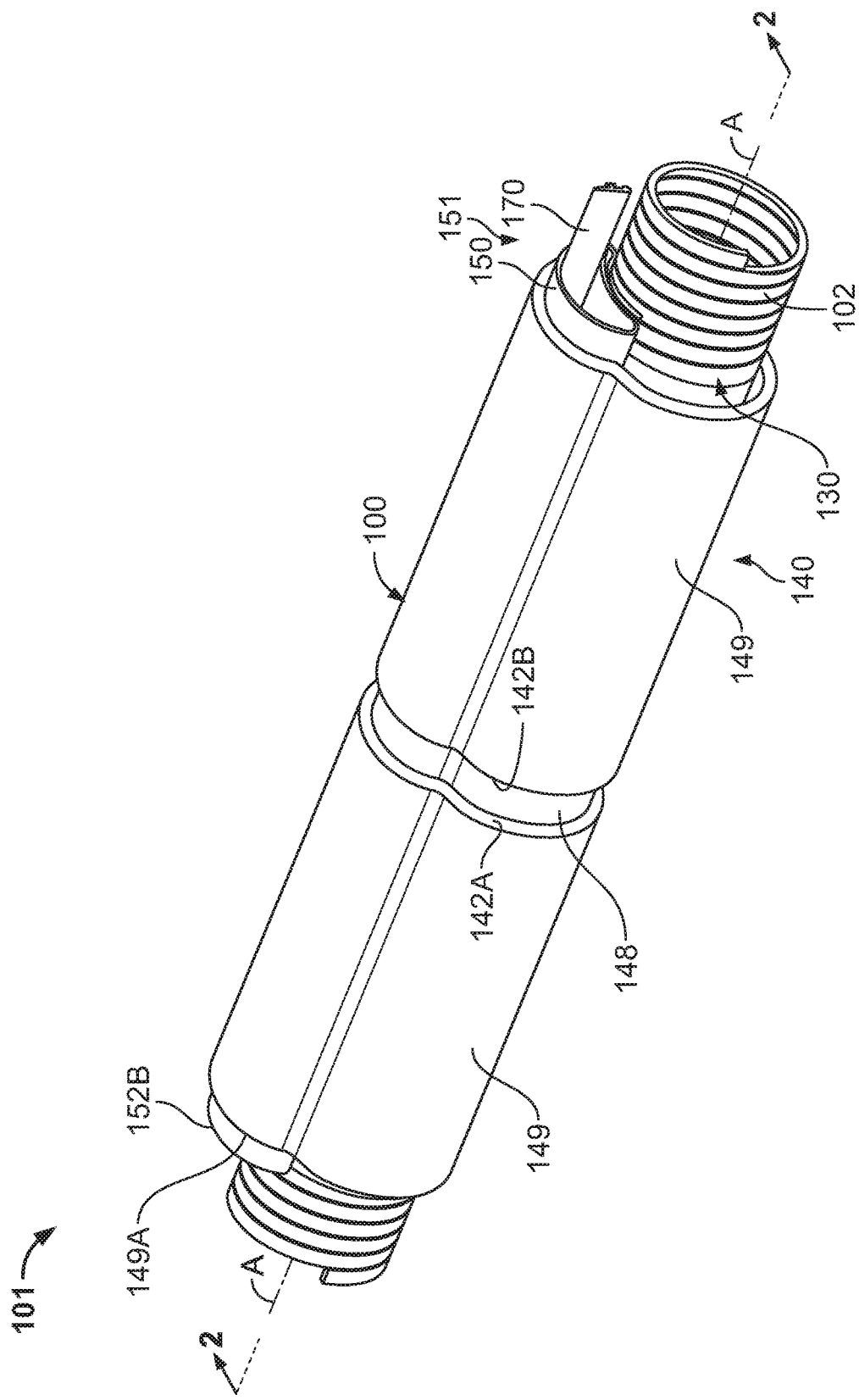
FIG. 1 is a perspective view of a pre-expanded unit including a cover assembly and a holdout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
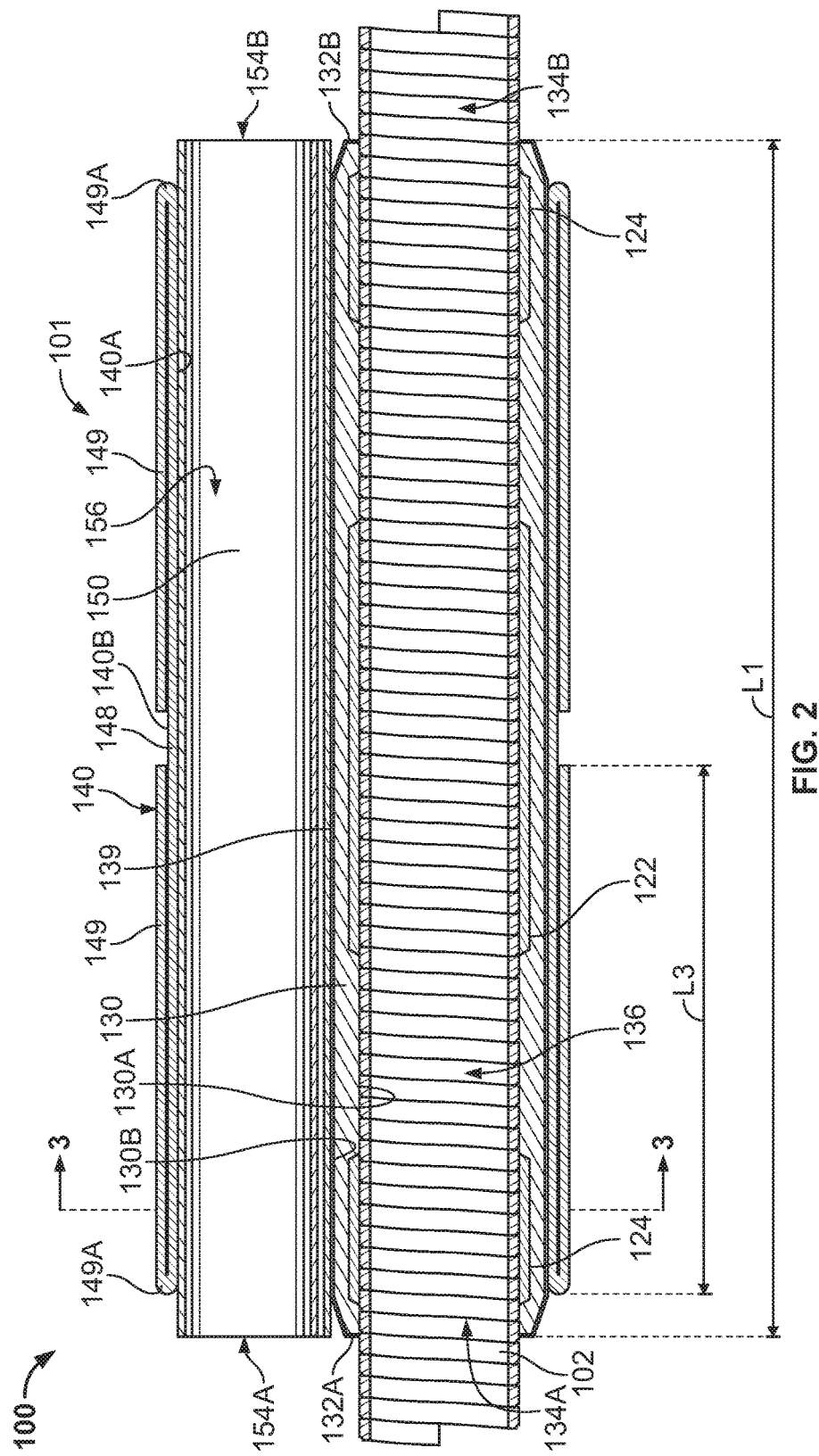
FIG. 2 is a cross-sectional view of the pre-expanded unit of FIG. 1 taken along the line 2-2 of FIG. 1.
Figure 3:
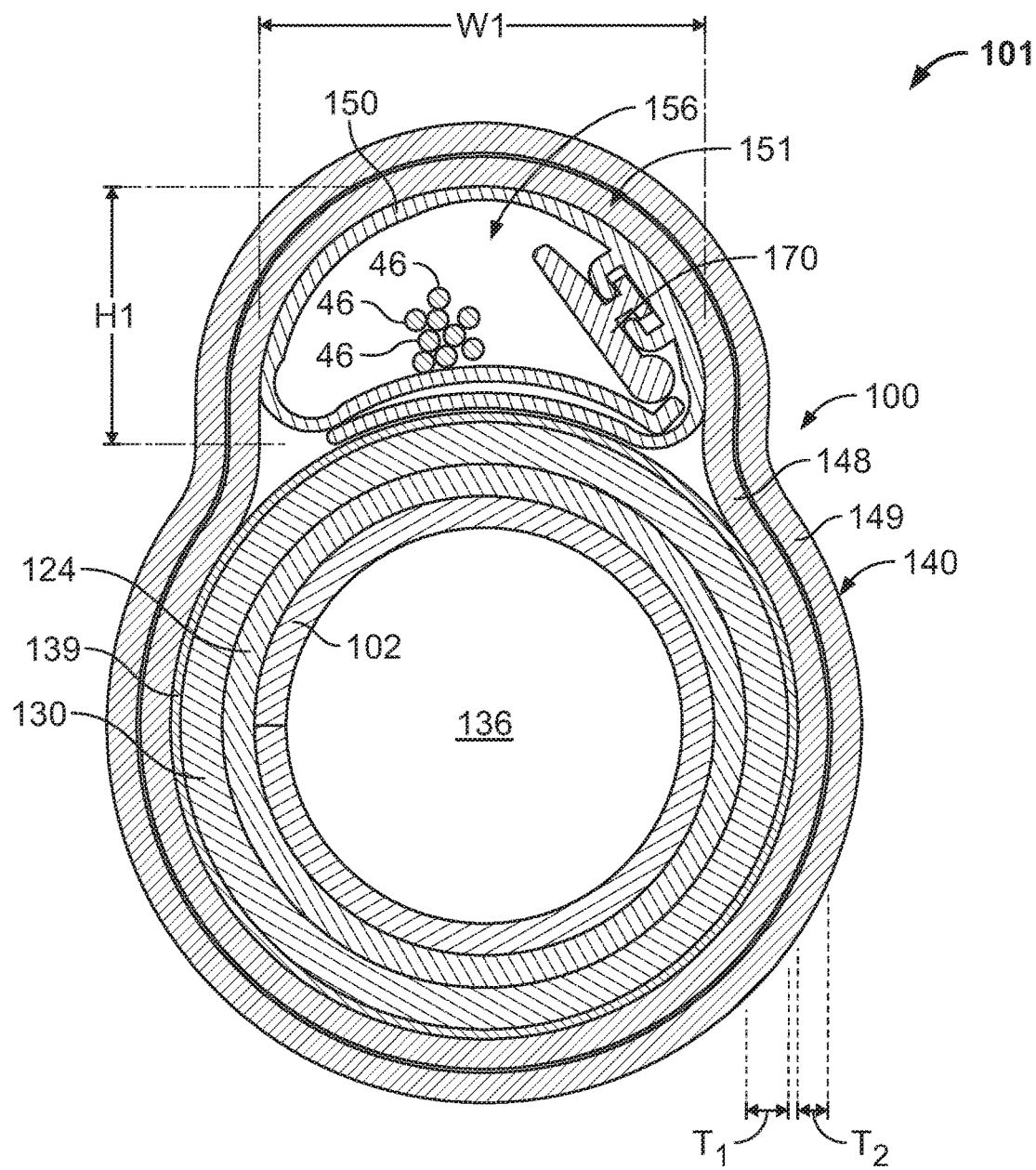
FIG. 3 is a cross-sectional view of the pre-expanded unit of FIG. 1 taken along the line 3-3 of FIG. 2, wherein a duct forming a part of the pre-expanded unit is in an open configuration and neutral conductors are illustrated extending through the duct.
Figure 14:
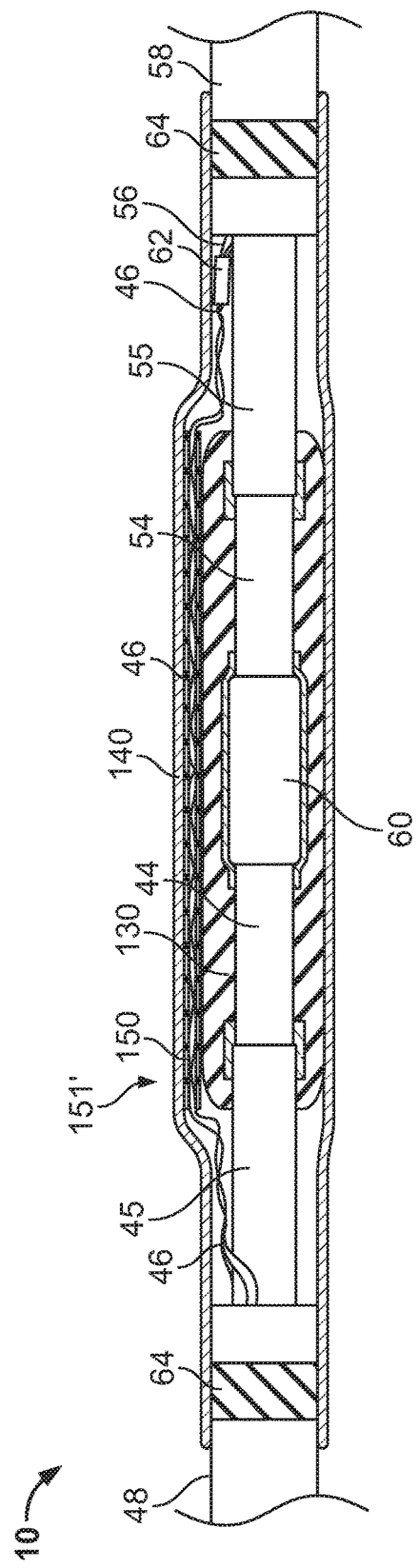
FIG. 14 is a cross-sectional view of the covered splice connection of FIG. 13.

With reference to FIGS. 1-7, a cover assembly 100 according to some embodiments of the present invention is shown therein. The cover assembly 100 includes a Faraday cage layer 122, stress cone layers 124, an inner sleeve (or insulation body) 130, a semiconductor layer 139, an outer sleeve (or re-jacket) 140, and an adjustable or collapsible duct 151, as discussed in more detail below. The cover assembly 100 may be used to cover and electrically insulate electrical substrates such as cables and connectors. The cover assembly 100 may be provided as a pre-expanded unit 101 including a holdout device 102, as shown in FIGS. 1-3, wherein the cover assembly 100 is in an expanded state or position. The cover assembly 100 may be deployed and mounted on the intended substrate in a retracted state or position as shown in FIGS. 13 and 14 and discussed in more detail below. According to some embodiments, the cover assembly 100 is a cold shrink cover, meaning that it can be shrunk or retracted about the substrate without requiring the use of applied heat.

The cover assembly 100 may be used to cover and seal a connection or splice between two or more cables 40, 50 including a connector 60 to form a connection assembly 10 as shown in FIGS. 13 and 14. According to some embodiments, the cables 40, 50 are concentric neutral cables.

Referring to FIGS. 1-3, the cover assembly 100 has a lengthwise axis A-A. The Faraday cage layer 122, the stress cone layers 124, the inner sleeve 130, the semiconductor layer 139, the outer sleeve 140, and the duct 151 are provided as an integral, unitary structure extending lengthwise along the axis A-A. According to some embodiments, the cover assembly 100 is provided pre-installed and pre-expanded on the holdout 102.

The inner sleeve 130 has opposed inner and outer surfaces 130A and 130B, and opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 120 of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The outer sleeve 140 has opposed inner and outer surfaces 140A and 140B, and opposed ends 142A, 142B. The inner sleeve 140 is tubular and defines an axially extending conductor through passage that communicates with opposed end openings 144A, 144B. When mounted on the holdout 102 as shown in FIGS. 1-3, outer sections 149 of the outer sleeve 140 are folded back on an intermediate section 148 of the outer sleeve 140 at annular folds 149A.

Figure 4:
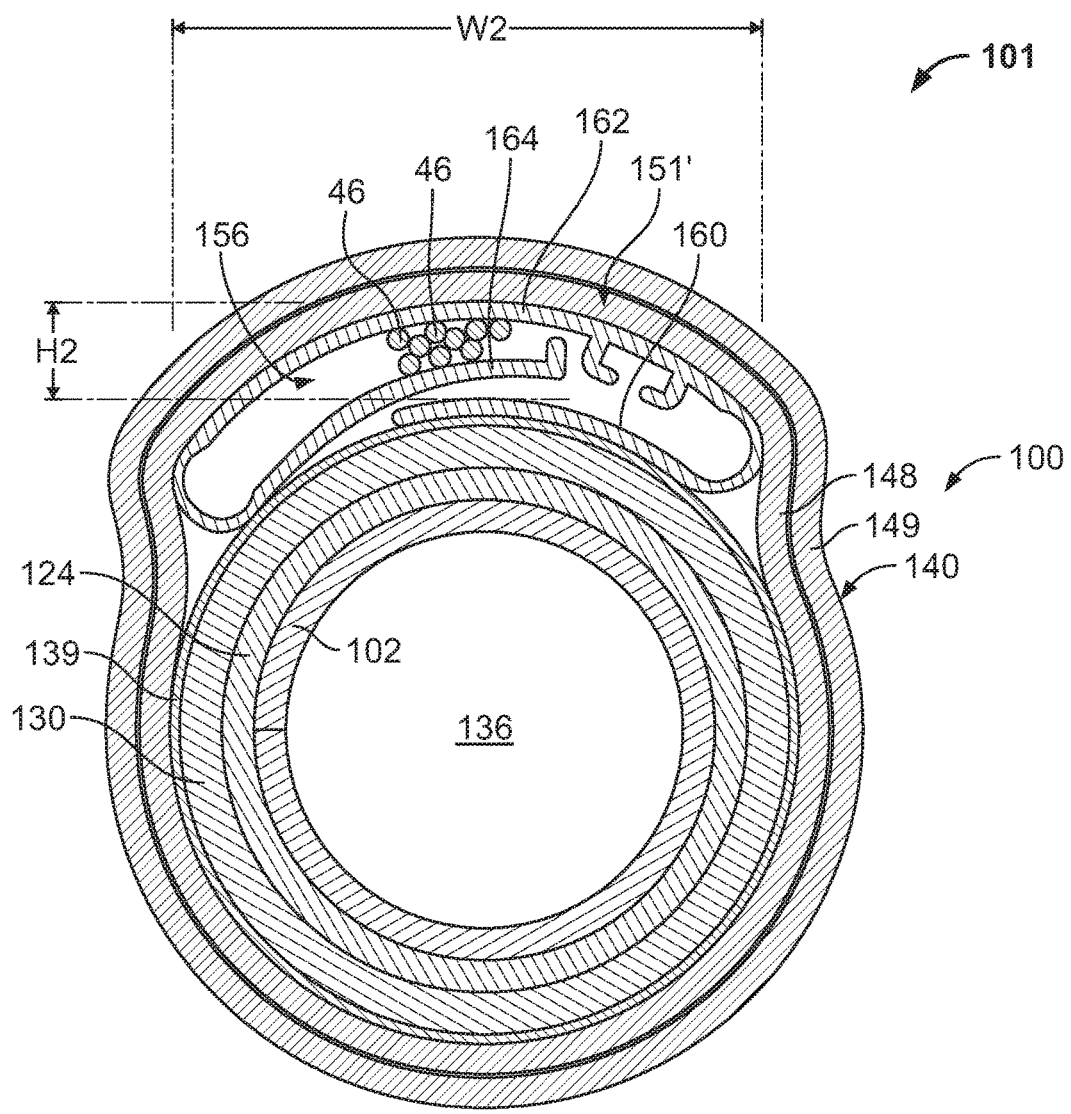
FIG. 4 is a cross-sectional view of the pre-expanded unit of FIG. 1 taken along the line 3-3, wherein the duct is in a collapsed configuration and the neutral conductors are illustrated extending through the duct.
Figure 5:
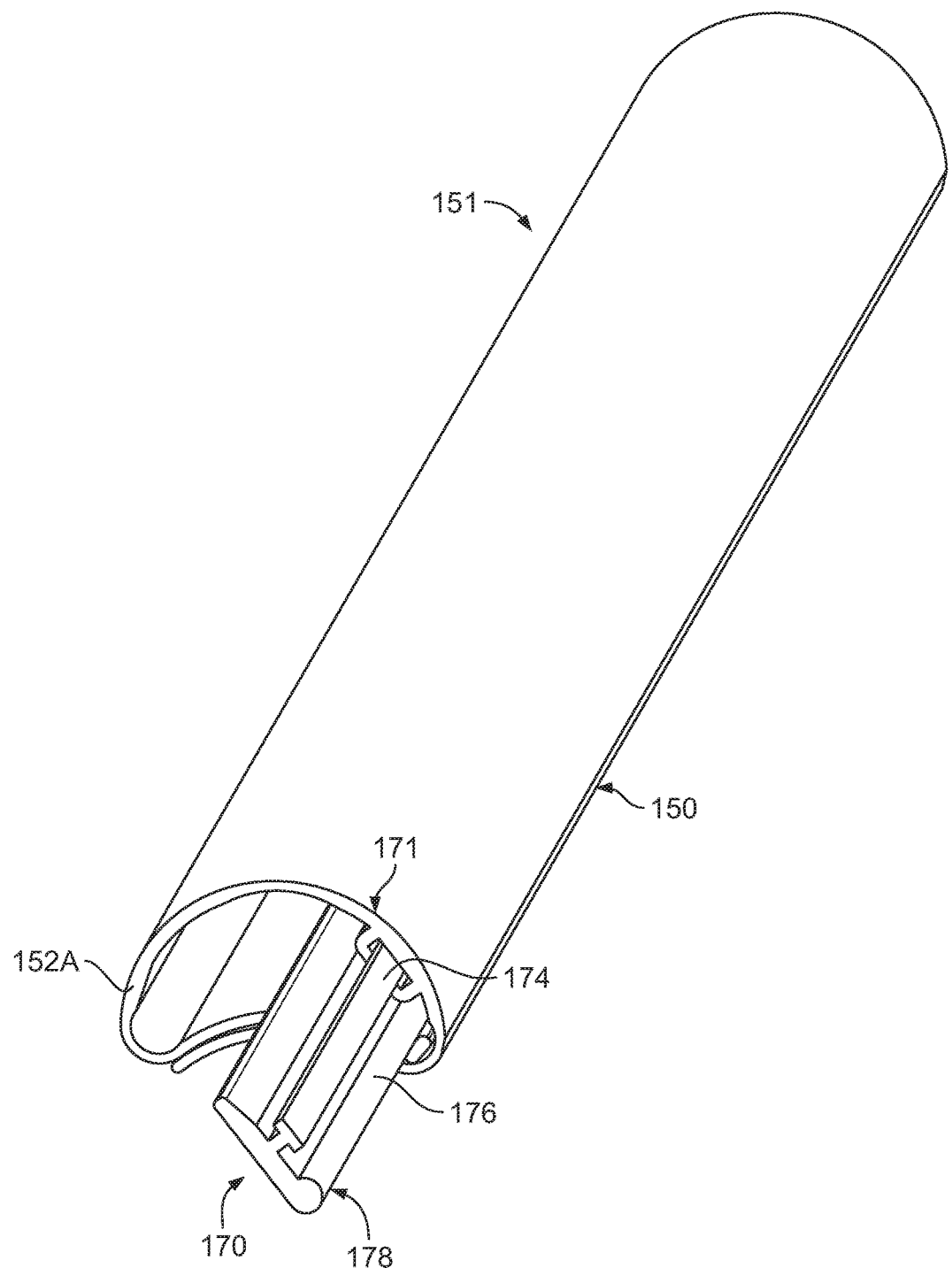
FIG. 5 is a perspective view of the duct of FIG. 4 in the open configuration.
Figure 6:
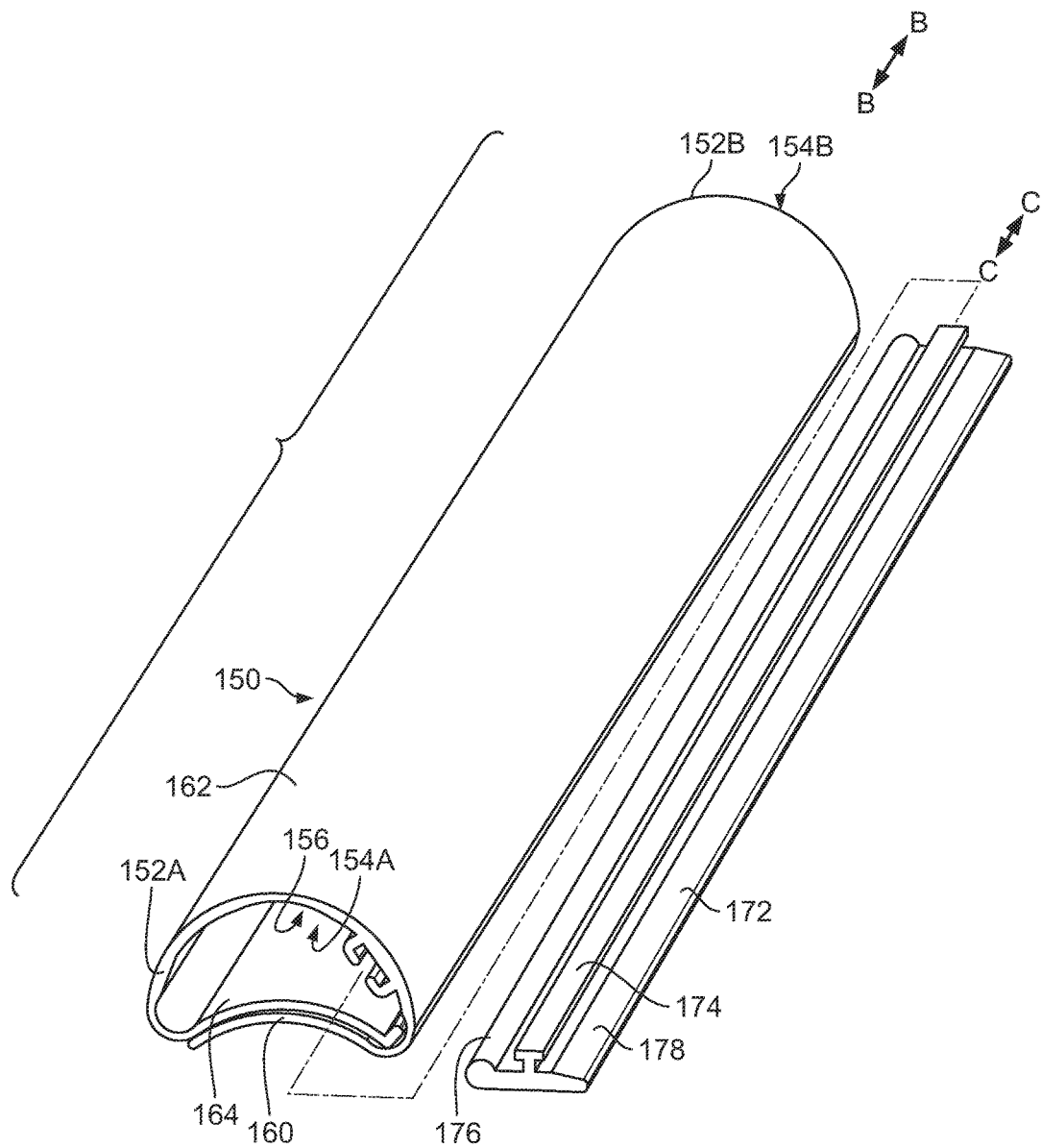
FIG. 6 is an exploded, perspective view of the duct of FIG. 4.

The duct 151 is a tubular assembly including a duct body member 150 and a retention member 170. The duct 151 has opposed ends 152A, 152B and a lengthwise axis B-B extending substantially parallel to the cover assembly axis A-A. The duct 151 can assume an expanded, erected or open configuration as shown in FIGS. 1-3, 5 and 7 and, alternatively, a compressed or collapsed configuration as shown in FIGS. 4 and 14.

The body member 150 has an inner surface 158A and an outer surface 158B. The inner surface 158A defines an axially extending neutral conductor through passage 156 terminating at and communicating with opposed end openings 154A, 154B.

The body member 150 includes an outer, bottom wall section 160, an intermediate, top wall section 162, and an inner wall section 164. The sections 160 and 162 are joined by an axially extending joint 165A. The wall sections 162 and 164 are joined by an axially extending joint 165B. In some embodiments, the joints 165A, 165B have a smaller thickness than the sections 160, 162, 164 so that the body member 150 preferentially bends at the joints 165A, 165B. Additionally, the top wall section 162 has a central reduced thickness portion 165C that causes the top wall section 162 to preferentially bend at that location. The outer wall section 160 underlaps the inner wall section 164.

An integral, upstanding retention flange 166 extends along (in some embodiments, the full length of) the axial terminal edge of the inner wall 164 and projects radially into the passage 156. Two opposed retainer rails 168 extend axially along (in some embodiments, the full length of) the intermediate wall section 162 and project radially into the passage 156. The retainer rails 168 define an axially extending, T-shaped slot 168A therebetween.

Figure 7:
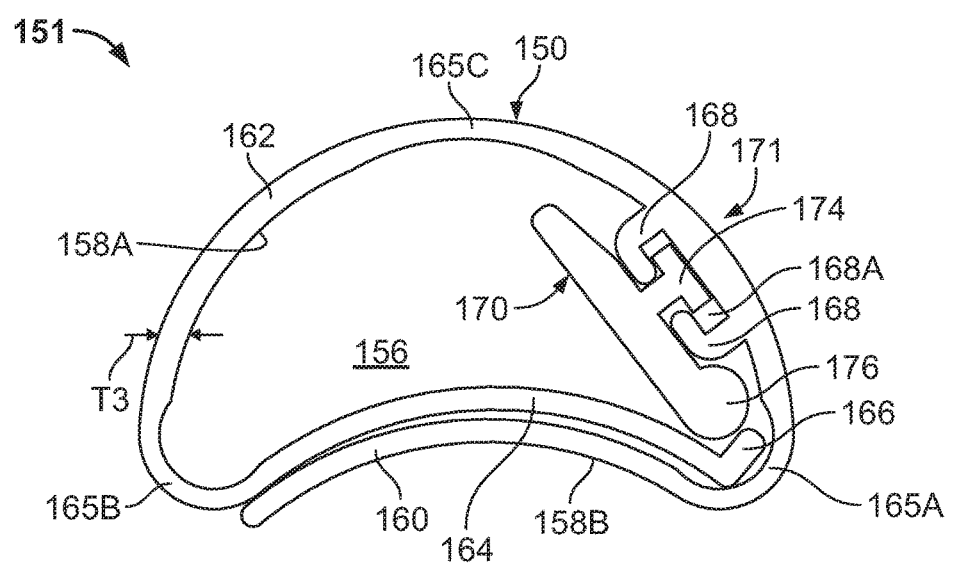
FIG. 7 is an end view of the duct of FIG. 4 in the open configuration.
Figure 8:
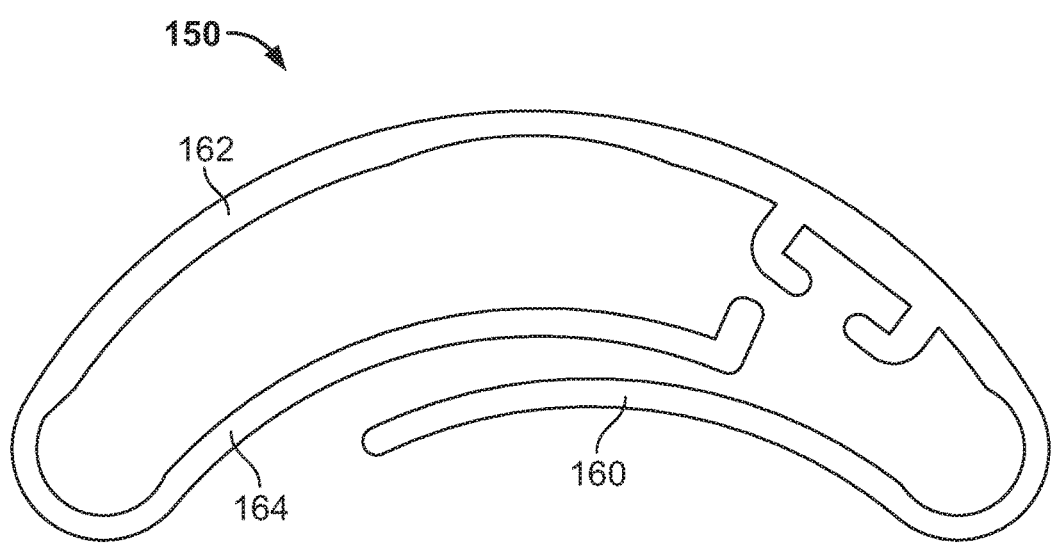
FIG. 8 is an end view of a body member forming a part of the duct of FIG. 4 in a relaxed state.

In some embodiments, the body member 150 is manufactured to have a relaxed configuration as shown in FIG. 8. The body member 150 is radially expanded into the open configuration (FIGS. 3 and 7). However, in the collapsed configuration (e.g., FIG. 4), the body member 150 may be radially reduced as compared to the relaxed configuration.

The retention member 170 has a lengthwise axis C-C extending substantially parallel to the body member access B-B. The retention member 170 includes an elongate body 172. An integral, axially extending rail feature 174 extends (e.g., perpendicularly) from the body 172 and has a T-shaped cross-section. An integral, axially extending abutment feature 176 is provided on an axial side edge of the body 172. In the open configuration, a grip portion 178 extends axially beyond the end 152A of the body member 150.

The retention member 170 and the features 168, 168A, 166 of the body member 150 cooperatively form a collapse control mechanism 171.

In the open configuration, as shown in FIG. 3, the duct 151 is a relatively larger tubular rigid form and has a generally semi-circular shape in cross-section. The top wall section 162 has an arcuate or rounded outer cross-sectional profile. In some embodiments, the arc of the top wall section 162 extends across from about 160 to 180 degrees. In some embodiments and as shown in FIG. 3, the bottom wall section 160 and/or the inner wall section 164 also each have an arcuate or rounded profile. The rounded profile of the wall section 160 and/or the wall section 164 may substantially match the curvature of the layer 130. In the collapsed configuration, the sections 160, 162, 164 may also be rounded as shown in FIG. 4; however, the top wall section 162 may extend across a substantially shorter arc range (e.g., 60 to 120 degrees).

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness T1 (FIG. 3) of the inner sleeve 130 is in the range from about 0.07 to 2 inches. According to some embodiments, the length L1 (FIG. 2) of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness T2 (FIG. 3) of the outer sleeve 140 is in the range of from about 0.11 to 0.25 inch. According to some embodiments, the length L2 (FIG. 13) of the outer sleeve 140 is in the range of from about 15 to 35 inches. According to some embodiments, the length L3 (FIG. 2) of each outer section 149 of the outer sleeve 140 is in the range of from about 10 to 25 percent greater than the length L2.

According to some embodiments, in the open configuration the duct 151 has a width W1 (FIG. 3) in the range of from about 1 to 1.5 inches. According to some embodiments, in the open configuration the duct 151 has a height of H1 (FIG. 3) in the range of from about 0.5 to 1 inch. According to some embodiments, the length of the duct 151 is in the range of from about 0.1 to 2 inches greater than the length of the folded outer sleeve 140 (i.e., from fold 149A to fold 149A).

According to some embodiments, when the duct 151 is in the collapsed configuration (FIG. 4), the duct 151 has a width W2 (FIG. 4) in the range of from about 1.5 to 2 inches. According to some embodiments, when the duct 151 is in the collapsed configuration, the duct 151 has a height H2 in the range of from about 0.25 to 0.5 inch.

The body member 150 and the retention member 170 of the duct 151 can each be formed of any suitable material. The body member 150 and the retention member 170 may be formed of the same or different materials from one another.

According to some embodiments, the body member 150 is formed of a flexible, semi-rigid material. According to some embodiments, the body member 150 is formed of a polymeric material. According to some embodiments, the body member 150 is formed of polypropylene, ABS, or PVC.

According to some embodiments, the body member 150 is formed of a polymeric material having a flexural modulus in the range of from about 2 to 2.3 GPa and, in some embodiments, in the range of from about 2.25 to 2.28 GPa.

According to some embodiments, the body member 150 is formed of an electrically conductive material. According to some embodiments, the body member 150 is formed of an electrically conductive plastic. In some embodiments, the electrically conductive plastic is a plastic filled with electrically conductive particles such as carbon. Other suitable materials may include a metal such as copper or aluminum.

According to some embodiments, the body member 150 is formed of an electrically conductive material (e.g., an electrically conductive plastic) having a volume resistivity no higher than 100 Ω-cm.

According to some embodiments, the nominal thickness T3 (FIG. 7) of the sections 160, 162, 164 of the body member 150 is in the range of from about 0.04 to 0.1 inch.

The body member 150 may be formed by any suitable technique. According to some embodiments, the body member 150 is extruded and cut to length. In some embodiments, the body member 150 is a unitary, monolithic structure.

According to some embodiments, the retention member 170 is formed of a semi-rigid or rigid material. According to some embodiments, the retention member 170 is formed of a polymeric material. According to some embodiments, the retention member 170 is formed of polypropylene, ABS, or PVC.

According to some embodiments, the retention member 170 is formed of a polymeric material having a flexural modulus in the range of from about 2 to 2.3 GPa and, in some embodiments, in the range of from about 2.25 to 2.28 GPa.

The retention member 170 may be formed by any suitable technique. According to some embodiments, the retention member 170 is molded (e.g., injection molded). In some embodiments, the retention member 170 is a unitary, monolithic structure.

The holdout 102 can be formed of any suitable material. According to some embodiments, the holdout 102 is formed of a rigid cardboard or plastic. According to some embodiments, the holdout 102 includes a strip helically wound to form a rigid cylinder as illustrated, for example. The holdout device 102 may be factory installed. In some embodiments, the cover assembly 100 may instead be pre-expanded in the field using a suitable expansion tool.

The cover assembly 100 may be formed by any suitable method and apparatus. According to some embodiments, the inner sleeve 130 is molded and the outer sleeve 140 is thereafter insert overmolded about the inner sleeve 130 with the duct 151 interposed therebetween.

According to further embodiments, the inner sleeve 130 and the outer sleeve 140 are separately formed (for example, by molding or extrusion) and thereafter the outer sleeve 140 is mounted on the inner sleeve 130.

According to some embodiments, the inner sleeve 130 is unitarily molded. According to some embodiments, the outer sleeve 140 is unitarily molded. According to some embodiments, the body member 150 is unitarily molded.

Alternatively, one or more of the inner sleeve 130, the outer sleeve 140 and the body member 150 may be extruded. According to some embodiments, one or more of these components is unitarily extruded.

Figure 9:
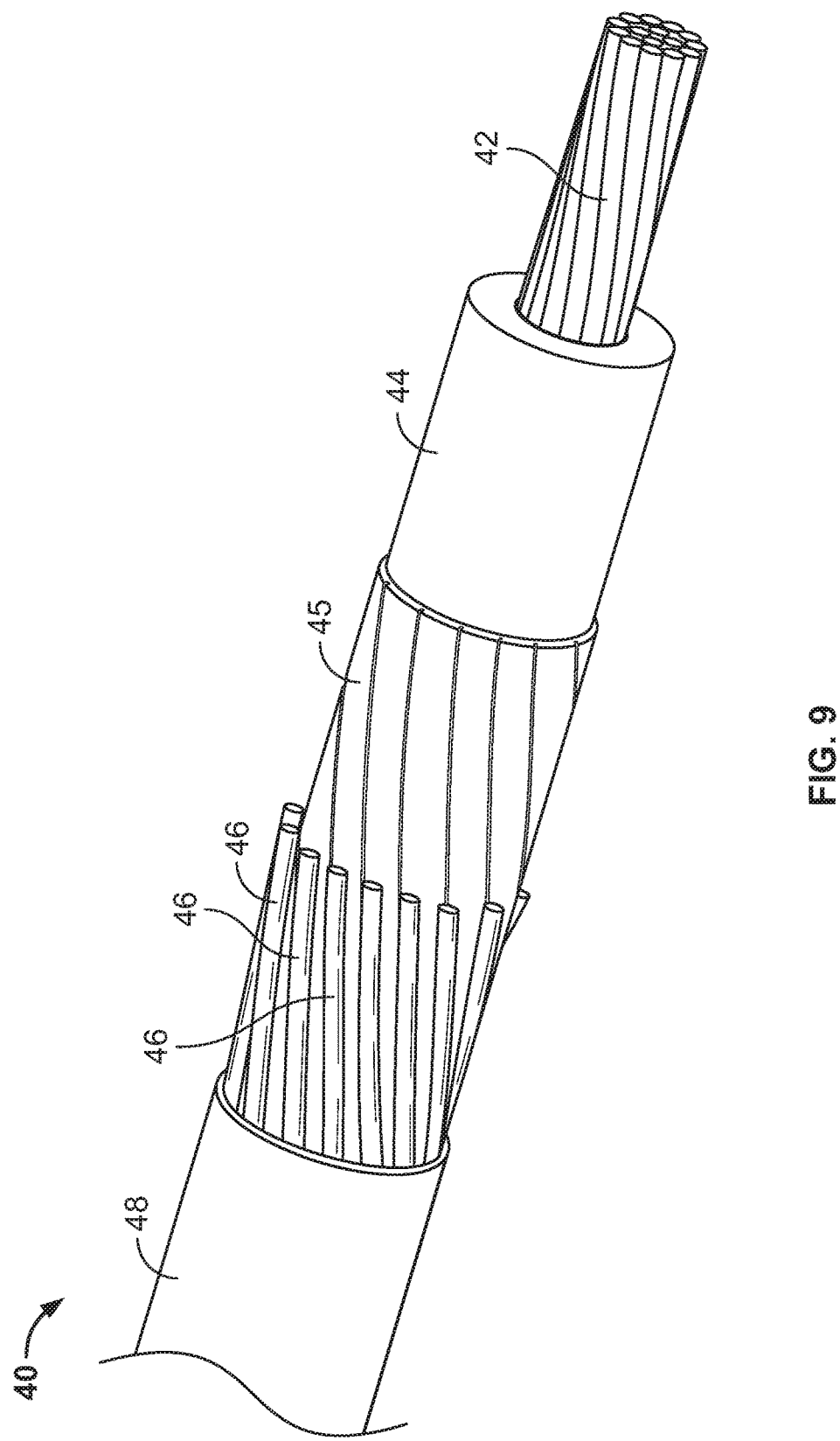
FIG. 9 is a perspective view of an exemplary concentric neutral cable.

Referring now to FIGS. 9-14, the unit 101 may be used in the following manner to apply the cover 100 over a splice connection 15 (FIG. 10) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 9, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 9 such that a segment of each layer extends beyond the next overlying layer, except that the neutral conductors 46 of the cable 40 extend at least a prescribed distance beyond the end of the primary conductor 42. This excess length of the conductors 46 can be folded back away from the terminal end of the primary conductor 42 as shown in FIG. 10.

Figure 10:
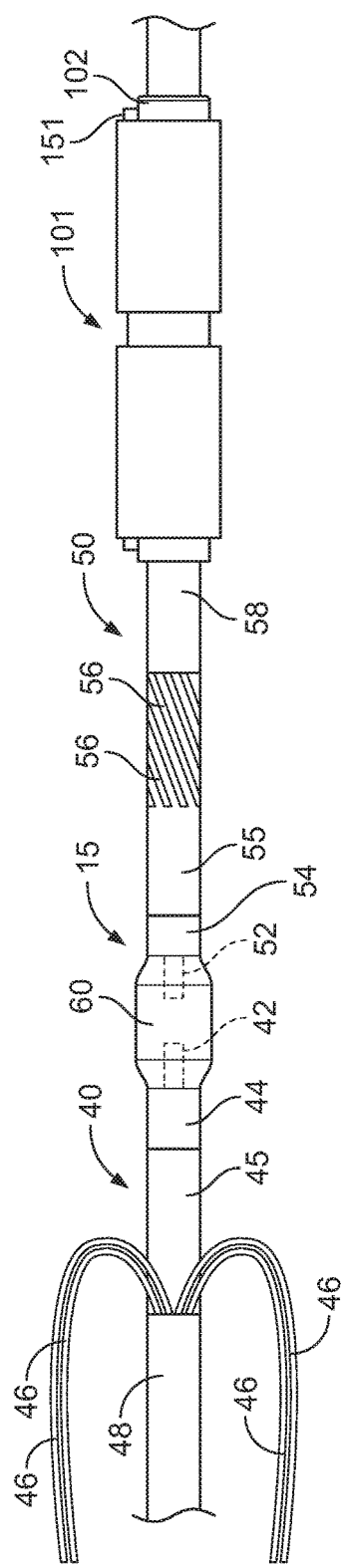

The pre-expanded unit 101 is slid over the cable 50 as shown in FIG. 10. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 101 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG.

10. The connector 60 may be any suitable type of connector such as a metal crimp connector.

Figure 11:
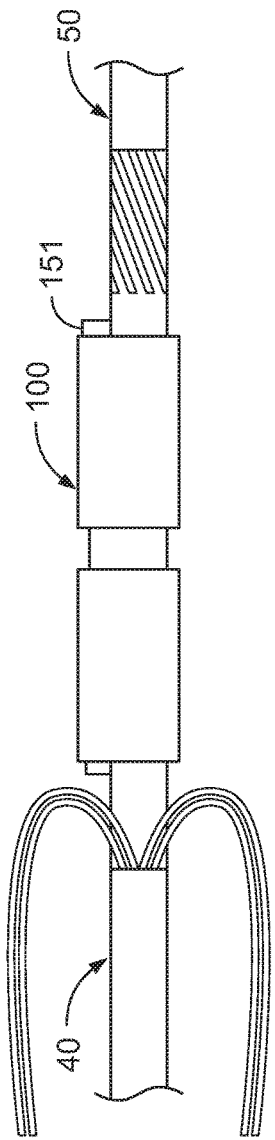

The pre-expanded unit 101 is then slid into position over the connector 60. The holdout 102 is then removed from the cover assembly 100, thereby permitting the elastomeric sleeves 130, 140 to relax and radially retract about the cables 40, 50 and the connector 60 as shown in FIG. 11. According to some embodiments, the inner sleeve 130 overlaps and engages the semiconductor layers 44, 54 of the cables 40, 50.

With the duct 151 still in its open configuration as shown in FIGS. 1-3, the excess length of the neutral conductors 46 is routed or threaded through the passage 156 of the duct 151. The neutral conductors 46 are then electrically and mechanically coupled to the neutral conductors 56 by any suitable neutral connector 70 as shown in FIG. 12. The neutral connector 70 may be any suitable connector such as a metal crimp connector. As shown in FIG. 12, the neutral conductors 46, 56 of the two cables 40, 50 may be coupled to one another on only one side of the connector 60. Alternatively, the neutral conductors 46, 56 may be coupled to one another on both sides of the connector 60.

The retention member 170 is then axially withdrawn from the body member 150, leaving the remainder of the duct 151 (i.e., the tubular body member 150) in place between the layers 130, 140. The operator may grasp the gripping portion 178 to facilitate removal.

Prior to removal of the retention member 170 from the body member 150, the abutment feature 176 of the retention member 170 interlocks with the retention flange 166 to resist or prevent the body member 150 from radially collapsing under the radially compressive load of the outer sleeve 140. In this manner, the duct 151 is maintained in the open configuration with the enlarged passage 156 for feeding the neutral conductors 46 there through. When the retention member 170 is removed, the retention flange 166 is freed and the wall sections 160, 164 can slide freely relative to one another.

The released body member 150 is forced by the recovery force load of the sleeve 140 to collapse radially inwardly and splay laterally or circumferentially to the collapsed configuration as shown in FIG. 4. The body member 150 now (in the collapsed configuration) forms the duct, which is designated in the drawings as duct 151'. The wall sections 160 and 164 slide relative to one another and to the wall section 162 deformed and partially flattens. The wall sections 160, 162, 164 may maintain or assume a rounded profile or shape generally matching that of the underlying sleeve 130. The flattening of the body member 150 is facilitated by its tendency to recover or return to its as-manufactured relaxed configuration as well as the reduced thickness bend portions 165A, 165B, 165C.

Moreover, the persistent recovery force of the sleeve 140 causes the top wall section 162 to exert a radially compressive load on the neutral conductors 46 and firmly clamp the neutral conductors 46 between the wall sections 162, 164. In this way, firm and reliable physical and electrical contact between the neutral conductors 46 and the inner surface 158 of the electrically conductive body member 150 is maintained. Also, the persistent recovery force of the sleeve 140 loads the bottom wall 160 into firm and reliable physical and electrical contact with the semiconductor layer 139. As a result, the semiconductor layer 139 is grounded by the neutral conductors 46 through the electrically conductive body member 150.

Accordingly, by transitioning from the open configuration to the collapsed configuration, the radial height of the duct 151 is reduced from the height H1 to the height H2. In some embodiments, the cross-sectional area or volume of the passage 156 is reduced when the duct 151 is transitioned from the open configuration to the collapsed configuration.

The adjustability of the neutral conductor passage 156 allows a single sized duct 151 to accommodate a variety of cable sizes.

The flattened profile of the collapsed or converted duct 151' creates a slimmer form for the splice, which eases the splice installation while still creating the tubular form for the neutral conductors 46 to pass through during installation.

In some embodiments, the cross-sectional area of the neutral conductor passage 156 at a given location along the axis B-B of the body member 150 in the collapsed configuration (FIG. 4) is less than the cross-sectional area of the passage 156 in the open configuration (FIG. 3) at the same axial location. In some embodiments, the radial height of the passage 156 at the axial location in the collapsed configuration is less than the radial height of the passage 156 at that axial location in the open configuration. The width and circumference of the duct 151' at the axial location in the collapsed configuration may be greater than the width and circumference of the duct 151 at the axial location in the open configuration.

Strips of sealant 64 may be applied to the outer surfaces of the cable jackets 48, 58. The operator then rolls each up the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 64 to provide a moisture seal. The cover assembly 100 is thereby fully installed to form the connection assembly 10 as shown in FIGS. 13 and 14.

Alternatively, the neutral conductors 46 can be routed through the duct 151 before the holdout 102 has been removed and the cover assembly 100 has been initially secured about the splice connection 15.

According to further embodiments, the cover assembly 100 may include more than one duct 151 and the ducts may be disposed at different positions about the circumference of the cover assembly 100. In this case, the neutral conductors 46 can routed through two or more of the ducts.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 thereby effects a liquid tight seal at the interface between the cable jackets 48, 58 and the outer sleeve 140. This seal can protect the cable and the splice from the ingress of environmental moisture. According to some embodiments the relaxed inner diameter of the inner sleeve 130 is at least 10% less than the smallest diameter cable upon which the cover assembly 100 is intended to be installed.

Cover assemblies and methods of the present invention and as described herein can provide a number of advantages. The cover assembly 100 provides an "all-in-one" integral unit that can be installed in similar fashion to known cold shrink splice cover insulating tubes and that also accommodates the neutral conductors of concentric neutral cables. The cover assembly 100 including the inner sleeve 130, the outer sleeve 140 and the duct 151 can be preassembled at a factory. Therefore, it is not necessary to provide and install a separate and supplemental rejacketing cover to cover the neutral conductors (which must be electrically insulated from the primary conductors 42, 52 and the primary connector 60).

The cover assembly 100 can also provide advantages over known "all-in-one" integral units of the type wherein an electrically conductive mesh is incorporated into the cover assembly to engage and provide continuity between the neutral conductors (typically, copper tapes) of the concentric neutral cables. In particular, in the case of these known cover assemblies, the electrically conductive mesh may not be sufficiently conductive to provide the amount of continuity desired or required. For example, the neutral conductors of the cables being spliced may have a greater combined gauge than that of the connecting mesh. By permitting the use of the original neutral conductors of the cables 40, 50, the cover assembly 100 can ensure that the neutral conductors provided across the cover assembly 100 and the splice connection 15 are of the proper gauge. In this way, adequate continuity between the cables 40, 50 can be ensured.

The cover assemblies and methods of the present invention also permit the operator to form the connection with only a single connection (for example, crimp connection) between the neutral conductors of one cable and the neutral conductors of the other cable. Moreover, this configuration permits the operator to form the connection with a crimp on only one side of the splice.

More generally, the cover assemblies and methods of the present invention can provide improvements in ease of installation. For example, in embodiments wherein the duct member is rigid or semi-rigid, the neutral conductors can be conveniently inserted through the passage of the duct member.

While in the embodiments shown in the drawings the neutral conductors are wires, according to further embodiments the neutral conductors may take other shapes or configurations such as one or more flat tapes. In some embodiments, an elongate jumper or extension conductor is provided that is clamped or otherwise secured in electrical contact with the cable neutral conductors (e.g., flat copper tapes) on either side of the splice and is routed through the duct 151 as described herein. In this case, the jumper conductor constitutes a neutral conductor and is an extension of the neutral conductor of at least one of the spliced cables. The jumper conductor may be a braided copper mesh or sock, for example.

While the duct 151 as illustrated extends the full length of the inner sleeve 130, according to other embodiments, the duct extends only partially (i.e., a distance less than the full length) across the inner sleeve 130.

Cover assemblies according to some embodiments of the present invention may include additional layers and/or certain layers may be omitted. For example, cover assemblies in accordance with some embodiments of the present invention may be formed without the semiconductor layer 139. One or more additional layers may be interposed between the inner sleeve 130 and the outer sleeve 140.

Cover assemblies and ducts according to embodiments of the invention may be used for any suitable cables and connections. Such cable assemblies may be adapted for use, for example, with connections of medium voltage cables up to about 46 kV. In some applications, the cover assemblies or ducts are installed on underground residential distribution (URD) cable splices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An integral, unitary cover assembly for covering an electrical connection between first and second electrical cables each having a primary conductor and a neutral conductor, the cover assembly comprising:
   an inner elastomeric sleeve defining a cable passage to receive the electrical connection and the primary conductors of the first and second cables;
   an outer elastomeric sleeve surrounding the inner sleeve; and
   a collapsible duct interposed radially between the inner and outer sleeves, the duct defining a neutral conductor passage configured to receive at least one of the neutral conductors therethrough;
   wherein the duct is selectively collapsible from an initial open configuration to a collapsed configuration about the at least one neutral conductor.

2. The cover assembly of claim 1 wherein a cross-sectional area of the neutral conductor passage at an axial location in the collapsed configuration is less than a cross-sectional area of the neutral conductor passage at the axial location in the open configuration.

3. The cover assembly of claim 1 wherein a height of the neutral conductor passage at an axial location in the collapsed configuration is greater than a height of the neutral conductor passage at the axial location in the open configuration.

4. The cover assembly of claim 1 wherein a circumference of the duct at an axial location in the collapsed configuration is greater than a circumference of the duct at the axial location in the open configuration.

5. The cover assembly of claim 1 configured such that, when the at least one neutral conductor extends through the neutral conductor passage and the duct is in the collapsed configuration, the duct is radially compressively loaded against the at least one neutral conductor.

6. The cover assembly of claim 5 configured such that, when the at least one neutral conductor extends through the neutral conductor passage and the duct is in the collapsed configuration, the duct is radially compressively loaded against the at least one neutral conductor by a recovery force of the outer elastomeric sleeve.

7. The cover assembly of claim 1 wherein the duct includes a collapse control mechanism operable by an operator to selective convert the duct from the open configuration to the collapsed configuration.

8. The cover assembly of claim 7 wherein:
   the duct includes a tubular duct body member;
   the collapse control mechanism includes a retention member mounted on the duct body member; and
   the retention member holds the body member open in the open configuration and is removable from the duct body member to permit the body member to radially collapse into the collapsed configuration.

9. The cover assembly of claim 8 wherein the collapse control mechanism includes an integral retention feature on the duct body member and that engages the retention member in the open configuration to hold the duct body member open.

10. The cover assembly of claim 1 wherein:
the duct member includes a substantially tubular duct body member including first and second axially extending, laterally opposed wall sections;
the first and second wall sections slide relative to one another as the duct is converted from the open configuration to the collapsed configuration; and
the first and second wall sections overlap in the collapsed configuration.

11. The cover assembly of claim 1 wherein the duct is formed of a polymeric material.

12. The cover assembly of claim 1 wherein the duct is formed of an electrically conductive material.

13. The cover assembly of claim 12 wherein the duct is formed of an electrically conductive polymer.

14. The cover assembly of claim 1 wherein the duct is semi-rigid.

15. The cover assembly of claim 1 wherein the duct is tubular.

16. The cover assembly of claim 1 wherein the cover assembly extends along a lengthwise axis from a cover first end to a cover second end, and the inner sleeve, the outer sleeve and the duct each extend lengthwise and have a respective first end proximate the cover first end and a respective second end proximate the cover second end.

17. The cover assembly of claim 1 wherein:
the outer sleeve is formed of ethylene propylene diene monomer (EPDM) rubber;
the inner sleeve is formed of silicone rubber;
the cover assembly includes a Faraday cage sleeve mounted within the inner sleeve and formed of an electrically conductive elastomer;
the cover assembly includes a stress cone sleeve mounted within the inner sleeve proximate an end thereof, wherein the stress cone sleeve is formed of an electrically conductive elastomer; and
the cover assembly includes a semiconductor layer mounted on an outer side of the inner sleeve.

18. The cover assembly of claim 1 further including a removable holdout device mounted within the inner sleeve, wherein the holdout device is operative to temporarily maintain the inner sleeve and the outer sleeve in an expanded state.

19. The cover assembly of claim 1 wherein the cover assembly is a cold shrinkable cover assembly.

* * * * *